Aug. 22, 1950 L. HOCHGRAF 2,520,007
TESTING CIRCUIT FOR CARRIER COMMUNICATION SYSTEM
WITH AUTOMATIC RESET TIMER
Filed Nov. 21, 1947
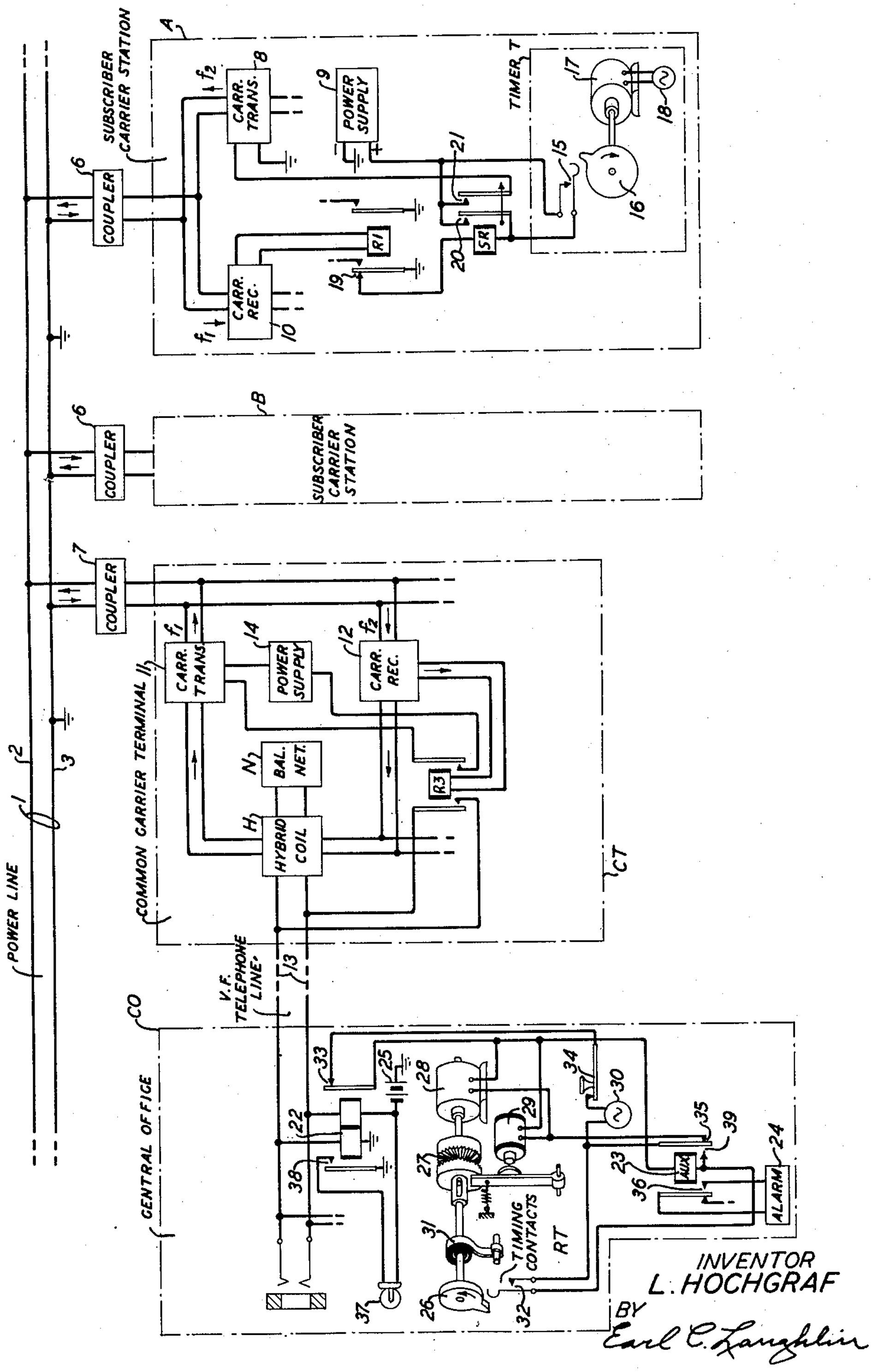
INVENTOR
L. HOCHGRAF
BY Earl C. Laughlin
ATTORNEY Patented Aug. 22, 1950 2,520,007

UNITED STATES PATENT OFFICE 2,520,007

TESTING CIRCUIT FOR CARRIER COMMUNICATION SYSTEM WITH AUTOMATIC RESET TIMER

Lester Hochgraf, Maplewood, N. J., assignor to Bell Telephone Laboratories, Incorporated, New York, N. Y., a corporation of New York Application November 21, 1947, Serial No. 787,459

7 Claims. (Cl. 179—175)

This invention relates to carrier wave communication systems and particularly to a testing circuit for use with such systems.

The testing circuit of the invention is especially applicable to carrier wave communication systems in which during idle periods no signal is transmitted and therefore no indication of failure is given. It may be used, for example, with a carrier system of the general type disclosed in the copending patent application of Robert C. Edson and John W. Emling, Serial No. 653,254, filed March 9, 1946, which issued as Patent No. 2,481,915 on September 13, 1949, employing one or more high frequency carrier channels to provide two-way telephone service to telephone subscribers over a common transmission medium, such as a power or telephone line, or a radio circuit. In the system disclosed in that application, a different group of subscriber two-way carrier telephone stations and an individual two-way carrier terminal connected to the common medium are associated with each carrier channel. A central switching office associated with the common carrier terminals of the several channels provides means for connecting any two of the subscriber carrier telephone stations associated with each carrier channel in communicating relation with each other on a party line basis over the common transmission medium through the individual carrier terminal for that channel, and also for connecting any subscriber carrier telephone station associated with each carrier channel in communicating relation with another subscriber telephone station associated with another carrier channel on the same medium or with an outside system over that medium through the individual carrier terminal for that channel and the central switching office. The carrier terminals operate as frequency changing and relay stations between the connected telephone subscriber stations. Three different high frequency electric waves per channel are employed as carriers for both signaling and speech transmission over the common line or other transmission medium. For each channel, transmission from the carrier terminal to the subscriber telephone stations is always on a carrier wave of one frequency ($f_1$) and transmission in the opposite direction from the carrier telephone stations to the carrier terminal is always on a carrier wave of either one of two other frequencies ($f_2$ and $f_3$), depending on the type of call (central office or party line).

An object of the invention is to test such a communication system for transmission troubles, such as telephone line, carrier line, power supply or equipment failures.

This object is attained efficiently and economically in accordance with the invention by a simple test circuit employing a small amount of equipment and requiring no extra line facilities. In one embodiment the test circuit of the invention comprises equipment including an electric timer and a slow release relay, adapted for attachment to the carrier telephone set at any subscriber station associated with any carrier channel on the common transmission medium, and other equipment including an electric timer of the "reset" type and an associated alarm device, adapted for attachment at the central switching office. The test equipment at the subscriber station operates to condition the transmitter of the subscriber's carrier telephone set, only when the associated line or other common medium is not being used on a telephone call, to send out a carrier wave of its normal transmitting frequency ($f_2$) over the common transmission medium to the individual carrier terminal for that channel where it controls equipment causing a signal to be sent to the associated central office, and a carrier wave of the terminal's transmitting frequency ($f_1$) to be sent back over the common medium to the subscriber station to operate the signal relay thereat, as for a normal telephone call over this type of carrier system. The operation of the latter relay is arranged to disable the test equipment at the subscriber station after a short time interval. This stops transmission of the carrier wave $f_2$ over the line and thus returns the equipment at the carrier terminal to its normal unoperated condition so as to stop transmission from that terminal of the carrier $f_1$ over the line and the signal to the central office. The signal of short duration transmitted to the central office during each test interval operates to reset the reset timer thereat to the zero timing position, and the associated alarm device is arranged to operate if the timer is not reset within a normal time interval to indicate circuit, line, power or apparatus failure in the carrier system.

The various objects and features of the invention will be better understood from the following detailed description when read in conjunction with the accompanying drawing, the single figure of which shows schematically one embodiment of the testing circuit of the invention applied to a carrier communication system of the above-described general type.

The carrier telephone system shown in block schematic form in the drawing is identical with that disclosed in the aforementioned copending patent application of Edson and Emling, but only those parts necessary to provide a proper description of the operation of the testing circuit of the invention have been illustrated. As shown, this carrier telephone system includes the transmission line 1 primarily employed for transmission and distribution of flow frequency (60 cycles), high voltage electric power, which line is shown as a single phase line consisting of one phase conductor 2 and a neutral conductor 3, the latter conductor being grounded at a number of spaced points, for example, at each pole.

A plurality of like subscriber two-way carrier telephone stations A, B . . . associated with one carrier channel on the power line 1, that is, all transmitting on the same carrier frequency and receiving on the same carrier frequency, are bridged across that line at different points by the coupler arrangements 6, and an individual two-way carrier terminal station CT for that carrier channel is bridged across the power line 1 at a terminal point by the terminal coupler arrangement 7. The subscriber station coupler arrangement 6 and the carrier terminal coupler arrangement 7 may be of any suitable types, for example, of the types illustrated in Figs. 5 and 4, respectively of the aforementioned Edson-Emling patent application.

Each of the subscriber stations, A, B . . . may comprise carrier transmitting, carrier receiving and associated control equipment identical with that illustrated at the subscriber's station A in Fig. 2 of the aforementioned Edson-Emling copending patent application, including a carrier transmitter 8 with its associated power supply circuit 9, and the carrier receiver 10 and the associated signal relay R1 normally employed for controlling the station signaling equipment, and for changing the subscriber station carrier transmitting frequency on reverting (party line) calls. As described in detail in connection with the similar subscriber carrier station A in the system of the aforementioned Edson-Emling patent application, when the carrier subscriber lifts his handset off the switchhook to initiate a telephone call, his carrier transmitter 8 will be energized from the associated power supply circuit 9 so as to send out a carrier wave of the normal frequency $f_2$ through the coupler device 6 to the line 1, and his carrier receiver 10 is conditioned at all times to select and rectify a carrier wave of the frequency $f_1$ which may be supplied thereto from the line 1 through the coupler device 6. The signal relay R1 associated with carrier receiver 10 may be operatively responsive to the rectified output of the carrier receiver 10, when a carrier wave of the frequency $f_1$ is applied to its input.

The common carrier terminal station CT may contain carrier transmitting, carrier receiving and control equipment therefor identical with that used in the similarly designated common carrier terminal station illustrated in Fig. 1 of the aforementioned Edson-Emling copending patent application. As indicated, the equipment at common carrier terminal station CT includes a normally deenergized carrier transmitter 11 which, when energized, is adapted to generate a carrier wave of the frequency $f_1$ for transmission to the line, and a carrier receiver 12 adapted for selectively detecting the communication signals from the carrier waves of the frequency $f_2$ applied to its input. The output of the carrier transmitter 10 and the input of the carrier receiver 12 are connected in parallel through the coupler device 7 to the line 1, and the input of the carrier transmitter 11 and the output of the carrier receiver 12 are coupled by the hybrid coil H and associated line balancing network N in conjugate relation with each other and in energy transmission relation with a two-wire voice frequency telephone line 13 extending to the central telephone switching office CO for the subscriber stations on the power line 1. A relay R3 associated with the carrier receiver 12 is responsive to the rectified output of the latter when a carrier wave of the frequency $f_2$ incoming over the power line 1 is applied to the input thereof to complete through its operated right-hand relay contacts an energizing circuit for the carrier transmitter 11 from the power supply 14 so that this transmitter will operate to send a carrier wave of the frequency $f_1$ through the coupler device 7 to the line 1. The carrier frequency $f_1$ will be transmitted back over the line 1 to the subscribers' stations A, B . . . and will cause operation of the signal relay R1 at each of these stations. The closed left-hand switching contacts of operated relay R3 at the carrier terminal CT will close a connection across the telephone line 13 to complete an energizing circuit for signalling or automatic control equipment (not shown) at the central office CO.

A portion of the testing circuit of the invention is shown attached to the carrier telephone set at subscriber's station A. It includes an electric timer T of any suitable type adapted to close the normally open switching contacts 15 at regular time intervals. For example, the timer T may comprise, as illustrated, the revolving cam 16 driven by motor 17 energized from a power source 18, which may be the same power source as used for the subscriber's carrier telephone set or a separate power source as illustrated. The design of the cam and its speed of revolution are selected so that the contacts 15 are closed thereby for a short time interval in each revolution of desired time duration. The switching contacts 15 are connected in an energizing circuit for the slow-release relay SR from the station power supply 9, in series with the winding of that relay and the normally closed additional switching contacts 19 on the signal relay R1 associated with the subscriber's carrier receiver 10. A locking circuit for the relay SR is normally broken by the normally open front switching contacts 20 of unoperated relay SR in series with the winding of that relay, the normally closed switching contacts 19 of the unoperated relay R1 and the power supply 9. An energizing circuit for the carrier transmitter 8 from the power supply 9 is normally broken by the normally open back contacts 21 of unoperated relay SR.

The portion of the testing circuit of the invention located at the central office CO includes the control relay 22, the electric timer RT, the auxiliary relay 23 and the alarm device 24. The operating windings of the control relay 22 are connected in series with the battery 25 across the two conductors of the telephone line 13 entering the central office CO.

The electric timer RT may be of the known "reset" type shown including the cam 26 adapted to be rotated from a "zero" position through clutch 27 by motor 28 when the latter and the magnet 29 controlling clutch 27 are supplied with power from the power source 30, and to be returned or "reset" to the zero position when the clutch 27 is released by the removal of power from the clutch magnet 29 and motor 28, by the action of the "reset" spring 31. If power is continuously applied to the timer for a predetermined time interval, the cam 26 will be rotated to a position such that it will cause the normally open timing contacts 32 to be closed for a short time interval. The energizing circuit for the motor 28 and the clutch magnet 29 includes the normally closed right-hand contacts 33 of the unoperated control relay 22, the manual release key 34 and the normally closed right-hand back contacts 35 of the unoperated auxiliary relay 23. The timer RT is designed so that the time interval required for rotation of the cam 26 from its zero position to the position in which it causes closure of the timing contacts 32 will be greater than the time interval between the consecutive closures of the contacts 15 by the timer T at subscriber station A for a purpose which will be brought out later in connection with the complete description of the testing circuit of the invention.

An energizing circuit for the auxiliary relay 23 from the power source 30 through the closed manual release key 34 and the normally closed right-hand contacts 33 of control relay 22, is normally broken by the open condition of the timing contacts 32 in series therewith when the cam 26 is in the "zero" position or in the process of being rotated to the position where it closes these contacts. An energizing circuit for the alarm device 24, which may be a lamp or an audible alarm, is adapted to be closed through the made left-hand front contacts 36 of the auxiliary relay 23 when that relay operates. An operating circuit for the signal lamp 37 at the central office CO from the battery 25 is adapted to be closed through the closed left-hand contacts 38 of control relay 22 when that relay operates.

The operation of the testing circuit of the invention will now be described.

Assume that the timer T in the testing equipment at subscriber station A is in operation so that the switching contacts 15 are closed at regular predetermined time intervals. If a telephone call is in progress over the power line 1 or a subscriber station thereon is being called at the time when the contacts 15 of timer T close, this closure will have no effect on the operation of the slow release relay SR since the signal relay R1 of the subscriber's carrier telephone set will be operated in response to the incoming carrier of freqeuncy $f_1$ to open the switching contacts 19 to provide a break in the energizing circuit for the relay SR. Since the relay R3 at the common carrier terminal CT will also be operated in response to the received carrier of frequency $f_2$ during such a call to close an energizing circuit for the line relay 22 at the central office CO from battery 25 through the operated left-hand contacts of the relay R3 at the carrier terminal and the conductors of the telephone line 13, the consequent operation of relay 22 to open its right-hand contacts 33 will hold the power source 30 disconnected from the motor 28 and clutch magnet 29 of the reset timer RT at the central office. The timer RT will therefore be held reset during the progress of such a call or signaling period and will not begin timing until the carrier system is idle. The signal lamp 37 at the central office CO will also be operatively energized from battery 23 and the closed left-hand contacts 38 of operated relay 22 during this interval to indicate the busy condition of the carrier system.

If no call is in progress over the power line, the unoperated signal relay R1 at subscriber station A will maintain the switching contact 19 in the energizing circuit for relay SR closed; and the unoperated control relay 22 at the central office CO will maintain its switching contacts 33 closed to connect the power source 29 to the motor 28 and the clutch magnet 29 in the reset timer RT so that the timing cam 26 will be rotated by the motor 28 through clutch 27.

Each closure of the contacts 15 of the timer T at the subscriber station A will therefore result in the operation of the slow release relay SR to close its front and back contacts 20 and 21, respectively, to lock up the relay SR from the power source 9 and to energize the carrier transmitter 8 in the subscriber's carrier telephone set. The design of the timer T, of course, should be such as to provide a closure of the contacts 15 long enough to operate relay SR, but not more than say, several seconds. This is done so that the line 1 will not be held busy by the test circuit for an appreciable period of time. The energized carrier transmitter 8 will generate a carrier wave of the frequency $f_2$, which will be transmitted through the coupler device 6 and out over the power line 1.

At the carrier terminal CT, the received carrier wave of frequency $f_2$ will pass through the coupler device 7 to the carrier receiver 12 and in the manner previously described in connection with a telephone call, will cause operation of the relay R3. This will complete an energizing circuit for the control relay 22 in the central office CO from battery 25 over the telephone line 13, and cause the carrier transmitter 11 at the terminal to send a carrier wave of the frequency $f_1$ back over the line 1 to operate the signal relay R1 at subscriber station A. The operation of relay R1 at station A will open the switching contacts 19 to break the energizing circuit for the slow release relay SR from power supply 9 so that the latter relay will release after a short interval of time to turn off the carrier transmitter 8. The transmission of the carrier wave of frequency $f_2$ over the power line 1 will therefore cease, and the control relay R3 at the common carrier terminal CT will therefore release so as to stop transmission of the carrier wave of frequency $f_1$ over the power line 1, and to break the energizing circuit for the control relay 22 at the central office CO so that the latter relay will release also.

During the short test interval in which the control relay 22 at the central office CO is held operated in response to the test signal from the carrier terminal CT, the right-hand contacts 33 of that relay are held open to interrupt the supply of power from the source 30 to the motor 28 and the clutch magnet 27 of reset timer RT. This will cause clutch 27 to release and the reset spring 31 will then cause the cam 26 to be returned to its zero position. The cam 26 will remain in this condition until at the end of the test interval the release of the control relay 22 causes power to be again supplied from the source 30 to the motor 28 and clutch magnet 27 of the reset timer RT causing the cam 26 to be again driven by the motor through the clutch 27 to start another timing cycle.

If the reset timer RT is not reset in response to a test signal in the manner described within the normal time interval required for it to time-out (that is, the time required to rotate the cam 26 from its zero position to the position where it closes the timing contacts 32), the closure of the timing contacts 32 will complete an energizing circuit from the source 30 for the auxiliary relay 23 through closed timing contacts 32 and the closed contacts 33 of the unoperated control relay 22. Auxiliary relay 23 will then operate to close its right-hand and left-hand front contacts 39 and 36 and to open its closed right-hand back contacts 35. The closure of the front right-hand relay contacts 39 will complete a circuit to lock up the relay 23 from the power source 30, and the closure of the left-hand front relay contacts 36 will complete an energizing circuit for the alarm device 23 causing operation of the latter to indicate a trouble condition in the carrier system. The opening of the right-hand back contacts 35 of relay 23 will open the energizing circuit for the motor 28 and clutch magnet 29 from power source 30 so as to stop the motor and release the clutch 27. This will cause the timing cam 26 to be reset to its zero position in response to reset spring 31 so as to start another timing cycle. The operation of the alarm device 23 can be stopped by the central office operator by pressing the manual reset key 34 momentarily to break the energizing circuit for the auxiliary relay 23 from power source 30.

The reset mechanism in the reset timer RT above described may be made sufficiently slow-operating by any suitable means so as to prevent resetting of the timer in response to momentary operations of the control relay R3 at the carrier terminal by noise on the power line 1. The release time of the slow-release relay SR at subscriber station A should be made long enough to allow for the time required for the reset mechanism of the timer RT to complete its function.

Abnormal conditions of the carrier circuit can bring in two different types of trouble indications. In the first case, if no test carrier signal of frequency $f_2$ is received by the common carrier terminal CT or, if, when the test signal is received thereby, the signal indication is not properly relayed to the central office CO over the voice frequency telephone line 13 by operation of control relay R3, the reset timer RT at the central office CO will time-out and cause operation of the alarm device 23. In the second case, if a test carrier signal of the frequency $f_2$ is received by the carrier terminal receiver 12 and a signal indication is relayed to the central office CO by operation of the control relay R3, but, due to a failure in the carrier transmitter 11 at the common carrier terminal or the carrier receiver 10 at subscriber station A, the signal relay R1 at subscriber station A is not operated, the slow release relay SR will not be released. In the latter case, there will be a permanent busy condition, indicated by the continuous lighting up of the signal lamp 37 in the central office CO in response to the continuous operation of the control relay 22, which will demand attention in a manual exchange or bring in an alarm in a machine switching exchange after a time interval.

The testing circuit of the invention would operate equally well with a carrier communication system of the general type described utilized for applying a carrier communication channel to a toll telephone line, in which a carrier terminal station connected to the telephone line at one point includes equipment similar to that used in the carrier terminal of the above-described system, responsive to a carrier wave of one frequency received over the line from another carrier terminal station having equipment corresponding to that used at a carrier subscriber station in the above-described system, for sending a signal to an associated central office and for sending a carrier wave of a second frequency over the line to the other station, the testing equipment being associated with one carrier terminal station and with the central office associated with the other carrier terminal station. Other modifications and applications of the test circuit illustrated and described which are within the spirit and scope of the invention will occur to persons skilled in the art.

What is claimed is:

1. In combination, a carrier communication system including one or more carrier communication stations and a carrier terminal connected over a common transmission medium and a central switching office connected to said carrier terminal, means at one of said stations for periodically conditioning the station to transmit a wave of the normal station transmitting carrier frequency over said medium to said carrier terminal during a short test time interval, means at the carrier terminal operative to transmit a test signal to said central office while said carrier wave is being received at that terminal, timing means at said central office adapted to be reset to a zero timing condition in response to the signals received from said carrier terminal within given time intervals and means controlled by said timing means for giving an alarm if the test signals are not received at said office within said given time intervals.

2. A circuit arrangement for testing a carrier communication system including a transmission medium, one or more carrier subscriber communication stations and a carrier terminal connected to said medium and a central switching office connected to said carrier terminal, each of said communication stations including transmitting means adapted for sending out a carrier wave of one frequency over said medium to said carrier terminal and receiving means for selecting a carrier wave of a second frequency incoming over said medium from said carrier terminal and said carrier terminal including control means operative while a carrier wave of said one frequency is being received over said medium to cause a signal to be transmitted to said central office and a carrier wave of said second frequency to be sent back over said medium to the subscriber stations, said testing circuit arrangement comprising equipment adapted for attachment at any one of said stations, including means operating periodically to condition the transmitting means at that station so that it sends out a carrier wave of said one frequency over said medium to operate said control means at said carrier terminal and means responsive to the carrier wave of said second frequency sent back over said medium from said carrier terminal as a result of the operation of said control means thereat to stop transmission of the carrier wave of said one frequency from said one station, and equipment at said central office including timing means, means responsive to the signal of short duration received at said central office from said carrier terminal during each test interval to disable said timing means and alarm means controlled by said timing means and operating to give an alarm if the signals controlling the disabling of said timing means do not arrive at said central office within normal time intervals, to indicate circuit or apparatus trouble in said carrier system.

3. The testing circuit arrangement of claim 2 in which said means at said one station operating periodically to condition the transmitting means thereat to send out a carrier wave of said one frequency includes a second timing means operating at regular intervals and slow releasing relay means responsive to each operation of said second timing means to operatively energize the carrier transmitting means at the station, and said means at said one station for stopping transmission of the carrier wave of said one frequency comprises relay means responsive to the carrier waves of said second frequency incoming over said medium to break the energizing circuit for said slow releasing relay means so as to deenergize said carrier transmitting means after a short time interval.

4. The testing circuit arrangement of claim 2, in which the timing means at said central office includes reset mechanism for returning said timing means to the zero timing position in response to each test signal received by said central office, and said alarm means comprises relay means adapted to be operatively energized under control of the timing means at the central office only if that timing means is not reset by the signals arriving at said central office within normal time intervals, and an alarm device responsive to each operation of the latter relay means.

5. A circuit for testing a carrier communication system including a wave transmission medium, one or more carrier communication stations and a carrier terminal station connected to said medium and a central switching office for said stations connected to said carrier terminal, each of said carrier communication stations being adapted for selectively receiving carrier waves of one frequency incoming over said medium and under control of the subscriber thereat for normally sending out carrier waves of a second frequency over said medium to said carrier terminal station, and said carrier terminal station being normally conditioned for selecting carrier waves of said second frequency incoming over said medium and being responsive to the selected waves during the receipt thereof to send a signal to said central office, and to send a carrier wave of said one frequency over said medium to said carrier communication stations, said testing circuit comprising equipment adapted for attachment at one of said carrier communication stations, including timing means operating at predetermined regular time intervals, slow releasing relay means responsive to each operation of said timing means, only in the absence of carrier waves of said one frequency incoming over said medium, to condition the station for sending out a carrier wave of said second frequency over said medium to said carrier terminal and other means responsive to the carrier wave of said one frequency consequently received over said medium from said carrier terminal to disable said slow releasing means so as to stop after a given time interval transmission of the carrier wave of said second frequency from the station, and equipment adapted for attachment to said central office, including a second timing means of the type adapted to automatically reset itself to the zero timing position at regular time intervals, other means operating in response to the signal of short duration received at said central office from the carrier terminal during each test interval to reset said second timing means and alarm means controlled by said second timing means and operating to give an alarm if the latter is not reset by a test signal within a normal time interval, to indicate a trouble condition in said carrier system.

6. The circuit of claim 5, in which the timing means at said one station and said central office are relatively adjusted to make the regular time intervals between the operations of the first timing means at said one subscriber station shorter than the operating time intervals of said second timing means at said central office so that the latter timing means will be reset by test signals arriving at the central office within normal time intervals before it causes operation of said alarm means.

7. The circuit of claim 5, in which the resetting means of said second timing means is made sufficiently slow in operation to prevent that timing means from being reset momentarily in response to intermittent noise on said transmission medium, and the release time of the slow releasing relay means at said one subscriber station is made long enough to compensate for the delay in operation of said resetting means of said second timing means.

LESTER HOCHGRAF.

REFERENCES CITED

The following references are of record in the file of this patent:

UNITED STATES PATENTS

| Number | Name | Date |
|---|---|---|
| 2,039,405 | Green | May 5, 1936 |
| 2,137,023 | Monk | Nov. 15, 1938 |
| 2,250,950 | Goldsmith | July 29, 1941 |
| 2,315,383 | Andrews | Mar. 30, 1943 |
| 2,444,426 | Busignies | July 6, 1948 |